United States Patent
Kitazaki et al.

(10) Patent No.: US 7,957,879 B2
(45) Date of Patent: Jun. 7, 2011

(54) BRAKE CONTROL METHOD AND BRAKE CONTROL DEVICE

(75) Inventors: Tsuyoshi Kitazaki, Hiratsuka (JP); Jun Matsuda, Hiratsuka (JP); Naoshi Miyashita, Hiratsuka (JP); Yoshiaki Hashimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 769 days.

(21) Appl. No.: 11/940,227

(22) Filed: Nov. 14, 2007

(65) Prior Publication Data

US 2008/0114520 A1    May 15, 2008

(30) Foreign Application Priority Data

Nov. 14, 2006 (JP) .................. 2006-308083

(51) Int. Cl.
*B60T 8/00* (2006.01)
*B60T 8/1761* (2006.01)

(52) U.S. Cl. ............. 701/82; 701/79; 701/71; 73/146; 152/151; 152/208

(58) Field of Classification Search ............. 701/70, 701/71, 72, 82, 90, 74, 78, 79, 83, 91; 73/146, 73/146.5; 340/442; 152/151, 208, 209; 702/141, 702/151, 170
See application file for complete search history.

(56) References Cited

U.S. PATENT DOCUMENTS

| | | | |
|---|---|---|---|
| 7,203,579 B2 | 4/2007 | Yokota et al. | |
| 7,451,024 B2 * | 11/2008 | Brusarosco et al. | 701/29 |
| 2002/0162389 A1 * | 11/2002 | Yokota et al. | 73/146 |
| 2003/0136487 A1 * | 7/2003 | Radulescu | 152/209.15 |
| 2005/0085987 A1 * | 4/2005 | Yokota et al. | 701/80 |
| 2005/0204806 A1 * | 9/2005 | Brusarosco et al. | 73/146 |
| 2005/0234613 A1 * | 10/2005 | Brusarosco et al. | 701/29 |
| 2005/0247388 A1 * | 11/2005 | Ohsawa et al. | 152/209.9 |
| 2006/0201240 A1 * | 9/2006 | Morinaga | 73/146 |

(Continued)

FOREIGN PATENT DOCUMENTS

| | | |
|---|---|---|
| GB | 2 258 894 A | 2/1993 |
| JP | 2003-505293 A | 2/2003 |
| JP | 2003-182476 A | 7/2003 |

(Continued)

OTHER PUBLICATIONS

Extended European Search Report for EP 070221.116.3 dated Mar. 19, 2008.

*Primary Examiner* — Thomas G Black
*Assistant Examiner* — Ce Li
(74) *Attorney, Agent, or Firm* — Knobbe, Martens Olson & Bear LLP (57) ABSTRACT

A brake control device is provided to a wheel equipped with a tire, which has a function of applying a brake force to the wheel to put a brake thereon while adjusting the brake force. In the device, an acceleration sensor outputs acceleration data in a radial direction of the rotating tire, a predetermined detection range is set with respect to the acceleration data, a threshold value is set with respect to a corresponding part of the acceleration data falling within the detection range, the corresponding part of the acceleration data falling within the detection range is specified. Values of the specified acceleration data are compared with the threshold value, and a control signal for causing a braking device to adjust the brake force thereof is output in a case where some values of the acceleration data are larger than the threshold value.

6 Claims, 9 Drawing Sheets

U.S. PATENT DOCUMENTS

| | | | |
|---|---|---|---|
| 2007/0084276 A1* | 4/2007 | Matsuda et al. | 73/146 |
| 2007/0106446 A1* | 5/2007 | Phillips et al. | 701/71 |
| 2007/0205879 A1* | 9/2007 | Matsuda et al. | 340/438 |
| 2007/0213953 A1* | 9/2007 | Kitazaki et al. | 702/157 |
| 2007/0240502 A1* | 10/2007 | Morinaga et al. | 73/146 |
| 2009/0055040 A1* | 2/2009 | Nagaya | 701/29 |

FOREIGN PATENT DOCUMENTS

| | | |
|---|---|---|
| JP | 2005-306160 A | 4/2005 |
| JP | 2005-523192 A | 8/2005 |
| JP | 2006 142291 | 8/2006 |
| WO | WO 01/07306 A1 | 2/2001 |
| WO | WO 03/082644 A | 10/2003 |

* cited by examiner

BRAKE CONTROL METHOD AND BRAKE CONTROL DEVICE

CROSS REFERENCE TO RELATED APPLICATION

This application claims the benefit and priority to Japanese Application Number 2006-308083, filed on Nov. 14, 2006, the disclosure of which is hereby incorporated by reference in its entirety.

BACKGROUND OF THE INVENTION

The present invention relates to a brake control method and a brake control device, which are used for a braking device provided to a vehicle or the like, the braking device having a function of applying a brake force to a wheel equipped with a tire to put a brake thereon while adjusting the brake force, and more particularly, to a brake control method and a brake control device capable of controlling a brake force to be applied to a wheel without performing frequency analysis.

When a vehicle is making a turn, a tread portion of a tire provided with a slip angle partially slips on a road surface. In other words, the tread portion of the tire provided with a slip angle has a contact region formed of a region in which the tread portion adheres to the road surface (adhesion region) and a region in which the tread portion slips on the road surface (slip region). As the slip angle increases, the adhesion region decreases while the slip region increases. In the end, the whole contact region of the tire is formed only of the slip region, leading to a behavior in which the entire tire slide-skids on the road surface (slide skid behavior).

In general, it is difficult for a driver to detect the slide skid behavior. Further, once the skid behavior has occurred, it is difficult to suppress the skid behavior to return the steering to a controllable state. As a result, the steering of the vehicle goes out of control, often resulting in a car crash.

In view of the above-mentioned problem, there has been conventionally adopted a method in which a vehicle control device such as an anti-lock brake system (ABS) is provided to a vehicle so as to perform brake control of the vehicle, to thereby prevent the slide skid from occurring (see, for example, JP 2003-182476 A and JP 2005-306160 A).

JP 2003-182476 A discloses a vehicle control device capable of estimating the condition of a road surface to which a tire is brought into contact with and a travelling condition of the tire with high accuracy when a vehicle is travelling at a constant speed without any operations such as braking, driving, and steering, to thereby improve the travelling safety of the vehicle.

The vehicle control device according to JP 2003-182476 A includes a road surface condition and tire travelling condition estimating device and a vehicle control means for controlling the travelling condition of a vehicle based on a condition of a road surface and/or a travelling condition of the tire. The road surface condition and tire travelling condition estimating device frequency-analyzes, by a frequency analyzing means, a vibration information signal of a wheel detected by an acceleration sensor attached to a wheel rim to detect a vibration level of the vibration spectrum of the signal. Then, the device obtains the detected vibration level by using a G-table stored in a vibration level storing means, the G-table indicating a relation between the road surface friction coefficient $\mu$ and vibration level, to thereby estimate the road surface friction coefficient $\mu$.

JP 2005-306160 A also discloses a vehicle control device capable of extracting high frequency components from information of a vibratory waveform detected by an acceleration sensor and detecting the amplitude of the high frequency components when the tire tread passes by the trailing edge of the tire contact region with a ground, to estimate whether the road surface friction coefficient is large or small by comparing an amount of the amplitude with a threshold value set in advance, to thereby accurately estimate a road surface friction coefficient without frequency-analyzing data of the vibratory waveform.

However, in any one of the vehicle control devices disclosed in JP 2003-182476 A and JP 2005-306160 A, a frequency analysis is performed on a signal detected by the acceleration sensor, by frequency-analyzing the signal by the frequency analyzing means, or by extracting high frequency components from the signal, which leads to a problem that it is impractical because it takes time to start control of the vehicle. To make the device suitable for practical use, the processing rate of the frequency analysis needs to be increased.

SUMMARY OF THE INVENTION

The present invention has been made to solve the above-mentioned problems inherent in the prior art, and an object of the present invention is to provide a brake control method and a brake control device capable of controlling a brake force to be applied to a wheel without performing a frequency analysis to extract high frequency components.

The present invention provides a brake control method for a braking device having a function of applying a brake force to a wheel equipped with a tire to put a brake on a vehicle while adjusting the brake force, the brake control method comprising the steps of: acquiring, in time series, acceleration data of acceleration applied to the tire in a radial direction of the tire; setting a predetermined detection range with respect to the acceleration data and setting a threshold value with respect to values of corresponding part of the acceleration data falling within the predetermined detection range; specifying the corresponding part of the acceleration data falling within the predetermined detection range; and controlling, when a value or values of the specified part of the acceleration data exceeds or exceed the threshold value, the brake force to be applied to the wheel as a control target.

Preferably, in the step of setting the predetermined detection range, when a timing at which a leading peak in the acceleration data occurs in a vicinity of a leading edge of a contact region of the tire on a ground is determined to be set as a first timing, a timing at which a trailing peak in the acceleration data occurs in a vicinity of a trailing edge of the contact region of the tire is determined to be set as a second timing, and a midway timing between the first timing and the second timing is set as a reference timing, a certain section accounting for 10 to 100% of a section defined between the first timing and the second timing with the reference timing being located in a center of the section is defined, and the defined certain section is set as the predetermined detection range.

More preferably, in the step of specifying the corresponding part of the acceleration data falling within the predetermined detection range, a start timing and a finish timing of the predetermined detection range are associated with peak positions in an output signal which has a predetermined number of peaks which are generated in one rotation of the wheel, to thereby specify the corresponding part of the acceleration data.

The threshold value preferably corresponds to a certain value falling within a range which accounts for 10 to 100% of a value of the leading peak or a value of the trailing peak in the acceleration data, in a state where the wheel is not applied with a brake force.

The present invention provides a brake control device, comprising: a braking device provided to a wheel equipped with a tire, the braking device having a function of applying a brake force to the wheel to put a brake thereon while adjusting the brake force; an acceleration sensor for outputting time series acceleration data of acceleration acting on the tire in a radial direction of the tire; a control unit provided with a detection range setting unit to which the acceleration data is supplied, the detection range setting unit setting a predetermined detection range with respect to the supplied acceleration data and setting a threshold value with respect to values of a corresponding part of the acceleration data falling within the predetermined detection range, the control unit specifying the corresponding part of the acceleration data falling within the predetermined detection range, comparing a value or values of the specified part of the acceleration data with the threshold value, and outputting, in a case where the value or the values of the specified part of the acceleration data exceeds or exceed the threshold value, a control signal for causing the braking device to adjust the brake force.

Preferably, in the acceleration data, when a timing at which a leading peak occurs in a vicinity of a leading edge of a contact region of the tire on a ground is generated is set as a first timing, a timing at which a trailing peak occurs in a vicinity of a trailing edge of the contact region of the tire is set as a second timing, and a midway timing between the first timing and the second timing is set as a reference timing, the detection range setting unit defines a certain section accounting for 10 to 100% of a section defined between the first timing and the second timing with the reference timing being located in a center of the section and sets the section as the predetermined detection range.

More preferably, the control unit specifies the corresponding part of the acceleration data falling within the predetermined detection range, by obtaining an output signal which has a predetermined number of peaks generated in one rotation of the wheel, and by associating a start timing and a finish timing of the predetermined detection range with peak positions in the output signal.

The threshold value preferably corresponds to a certain value falling within a range which accounts for 10 to 100% of a value of the leading peak or a value of the trailing peak in the acceleration data, in a state where the wheel is not applied with a brake force.

The brake control method according to the present invention includes the steps of: acquiring, in time series, acceleration data in a radial direction of a tire; setting a predetermined detection range with respect to the acceleration data; specifying a corresponding part of the acceleration data falling within the detection range; and controlling, in a case where a value of the specified acceleration data is larger than the threshold value, a brake force. Accordingly, after the detection range and the threshold value are set, it is only necessary to specify the corresponding part of the acceleration data falling within the detection range and to compare a value of the data with the threshold value. Therefore, it is not necessary to perform frequency analysis, which makes it possible to perform control on the brake to be put on a vehicle with the speed of control operation of a brake force increased. As a result, the brake control device can be simplified in structure. As described above, the present invention is different from the conventional art in that the present invention is capable of controlling a brake force of a brake without performing frequency analysis for extracting high frequency components.

The brake control device according to the present invention includes: a braking device having a function of applying a brake force to a wheel equipped with a tire to put a brake on the wheel while adjusting the brake force; an acceleration sensor for outputting acceleration data in a radial direction of the tire; and a detection range setting unit for setting a predetermined detection range with respect to the acceleration data and setting a threshold value with respect to a value of a corresponding part of the acceleration data falling within the detection range. The brake control device specifies part of the acceleration data falling within the detection range, compares a value of the specified part of the acceleration data with the threshold value. In the case where the value of the specified part of the acceleration data is larger than the threshold value, the control unit outputs a control signal for causing the braking device to adjust a brake force. Accordingly, after the detection range and the threshold value are set, it is merely necessary to compare only the value of the part of the acceleration data falling within the detection range with the threshold value, with the result that the brake to be put on a vehicle is controlled with the speed of control operation of the brake force increased. Further, it is not necessary to perform frequency analysis, which makes it possible to simplify the structure of the device. As described above, according to the present invention, it is possible to control a brake force of a braking device without performing frequency analysis for extracting high frequency components.

DETAILED DESCRIPTION OF THE PREFERRED EMBODIMENT

Hereinbelow, a brake control method and a brake control device according to the present invention are described in detail based on a preferred embodiment with reference to the accompanying drawings.

Figure 1A:
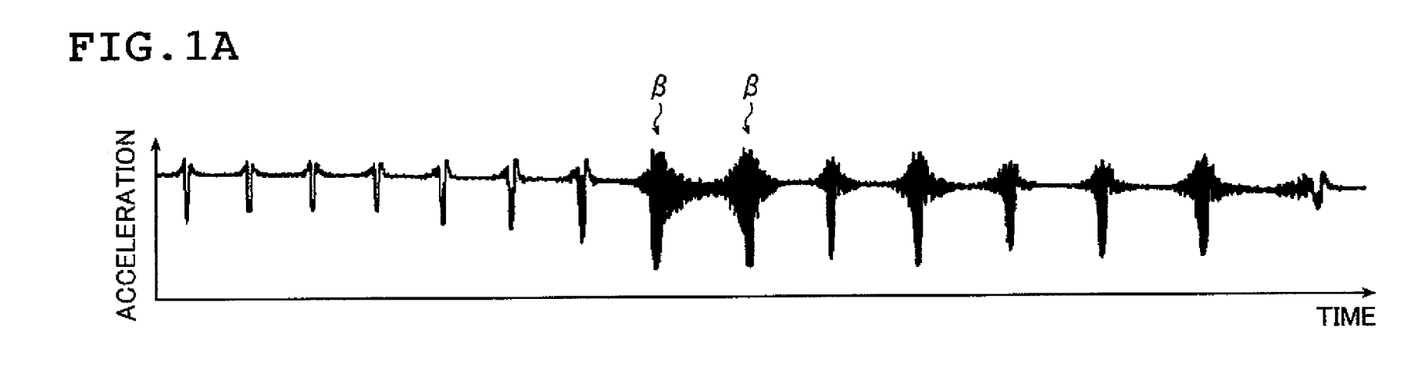
FIG. 1A is a graph showing acceleration data in a radial direction of a tire.
Figure 1B:
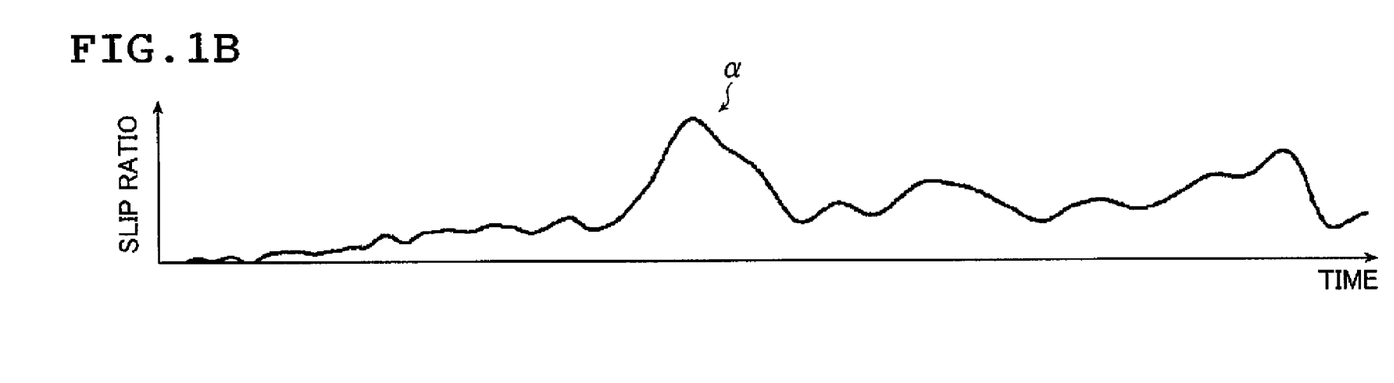
FIG. 1B is a graph showing a waveform of a slip ratio of the tire.

FIGS. 1A and 1B are graphs each showing acceleration data in the radial direction of a tire and a slip ratio of the tire in relation to the acceleration data, respectively, the data being acquired when a brake is put on a wheel of the tire rotating at 100 km/h.

The graph of FIG. 1A shows acceleration in the radial direction of the tire, the graph having acceleration on the vertical axis and time on the horizontal axis. The graph of FIG. 1B shows a slip ratio of the tire, the graph having a slip ratio on the vertical axis and time on the horizontal axis. The waveform of the slip ratio shown in FIG. 1B corresponds in timing to the acceleration data shown in FIG. 1A.

When a brake is put on the tire rotating at 100 km/h, in a region α where a slip ratio is large as shown in FIG. 1B, it is discovered that high frequency vibrations β appear in the time series data of acceleration (acceleration data) in the radial direction of the tire as shown in FIG. 1A. In this case, when the slip ratio is large, the tire is skidding.

As described above, a high frequency vibration in the time series data of acceleration in the radial direction of the tire indicates that the tire is skidding. Accordingly, the brake force is adjusted so as to reduce the high frequency vibration in the data of acceleration in the radial direction of the tire, to thereby control the brake to be put on the tire, which makes it possible to derive maximum performance from the tire and to stably perform brake control such as ABS control. The present invention has been made based on the above-mentioned findings.

Figure 2:
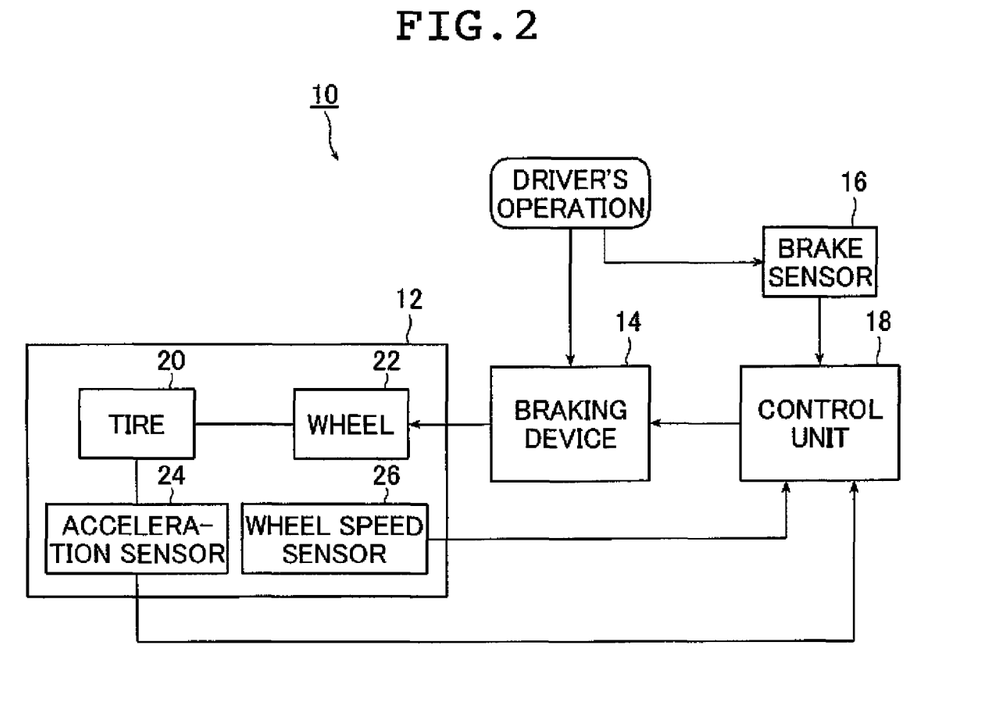
FIG. 2 is a block diagram illustrating a brake control device according to an embodiment of the present invention.

FIG. 2 is a block diagram illustrating a brake control device according to an embodiment of the present invention.

The brake control device 10 shown in FIG. 2 is generally provided to a vehicle such as an automobile, for adjusting a brake force of a braking device 14 so as to prevent a skid from occurring in a tire 20, by using acceleration data in the radial direction of the tire 20 detected by an acceleration sensor 24 and a rotation detection signal output by a wheel speed sensor 26 provided to a wheel 12.

The brake control device 10 basically includes the wheel 12, the braking device 14 having a function of applying a brake force to the wheel 12 while adjusting the brake force, a brake sensor 16 for detecting a brake applied by a driver, and a control unit 18 for controlling a brake force of the braking device 14.

The wheel 12 includes an inflated tire 20 and a wheel 22 to which the tire 20 is attached. The wheel 12 may have another structure similar to a wheel of a general automobile.

Figure 3:
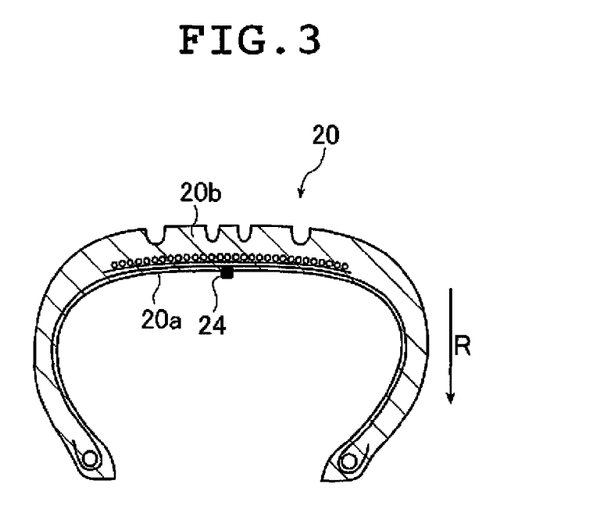
FIG. 3 is a schematic cross-sectional diagram illustrating a mounting position of an acceleration sensor according to the embodiment of the present invention.

In this embodiment, the acceleration sensor 24 is attached, for example, to a surface of an inner liner portion 20a in a cavity region of the tire 20.

The acceleration sensor 24 detects acceleration in the radial direction R of a tread portion 20b of the tire 20 in time series. Also, the acceleration sensor 24 is provided with a transmitter (not shown), and connected to the control unit 18 through the transmitter.

In this embodiment, the acceleration sensor 24 detects acceleration in the radial direction R and outputs the acceleration thus detected. For example, a semiconductor acceleration sensor is employed as the acceleration sensor 24.

The semiconductor acceleration sensor includes, specifically, a Si wafer having a diaphragm formed inside the outer peripheral frame portion of the Si wafer, and a pedestal for fixing the outer peripheral frame portion of the Si wafer. A weight is provided at the center part of one surface of the diaphragm, and a plurality of piezoresistors are formed on the diaphragm. When acceleration is applied to this semiconductor acceleration sensor, the diaphragm is deformed to cause the resistance values of the piezoresistors to change. In order to detect such changes as acceleration information, a bridge circuit is formed.

The acceleration sensor 24 is not limited to the semiconductor acceleration sensor, and may include any acceleration sensor capable of detecting acceleration in the radial direction R of the tire 20.

Further, the wheel speed sensor 26 for detecting a wheel speed is provided to an axle shaft (not shown) or a hub (not shown) on a vehicle side or in the vicinity of the wheel 12.

Figure 4A:
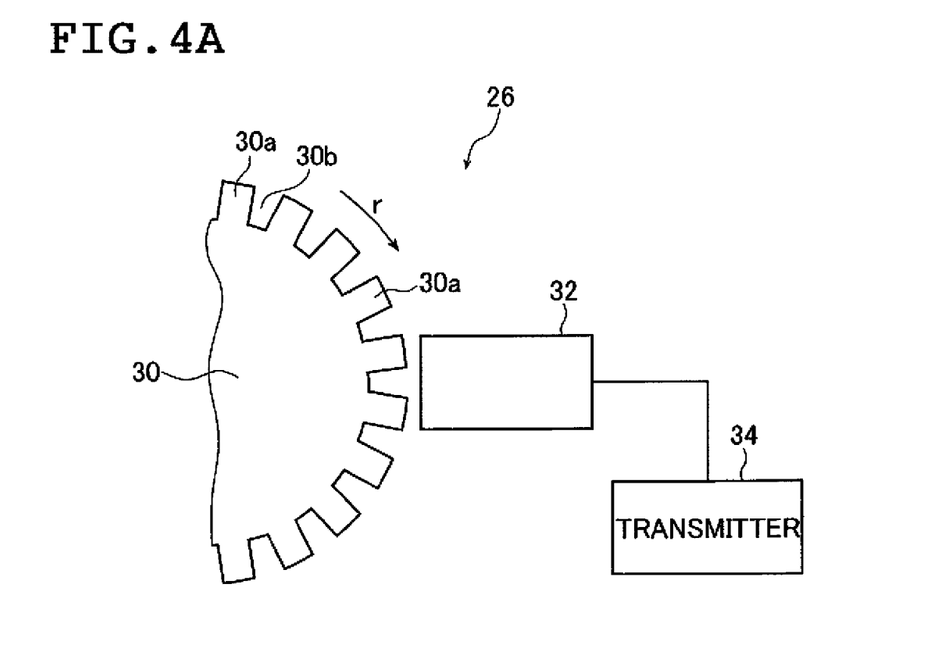
FIG. 4A is a schematic diagram illustrating a structure of a wheel speed sensor according to the embodiment of the present invention.

The wheel speed sensor 26 includes, as shown in FIG. 4A, a gear pulsar 30 attached to a wheel, a sensor unit 32 provided as opposed to the gear pulsar 30, and a transmitter 34 for transmitting a rotation detection signal 36 obtained by the sensor unit 32.

The gear pulsar 30 is formed of a disk member, which has a predetermined number of teeth 30a formed along the entire circumference of the felly of the disk member at a predetermined pitch so as to provide gaps 30b therebetween. The gear pulsar 30 rotates along with the rotation of the wheel 12. For example, when the wheel 12 rotates in an r direction, the gear pulsar 30 also rotates in the r direction.

The sensor unit 32 includes a magnetic core having high magnetic permeability, a permanent magnet provided in series with the magnetic core, and a coil provided on the periphery of the magnetic core. The sensor unit 32 is provided such that the magnetic core faces toward the gear pulsar 30.

Figure 4B:
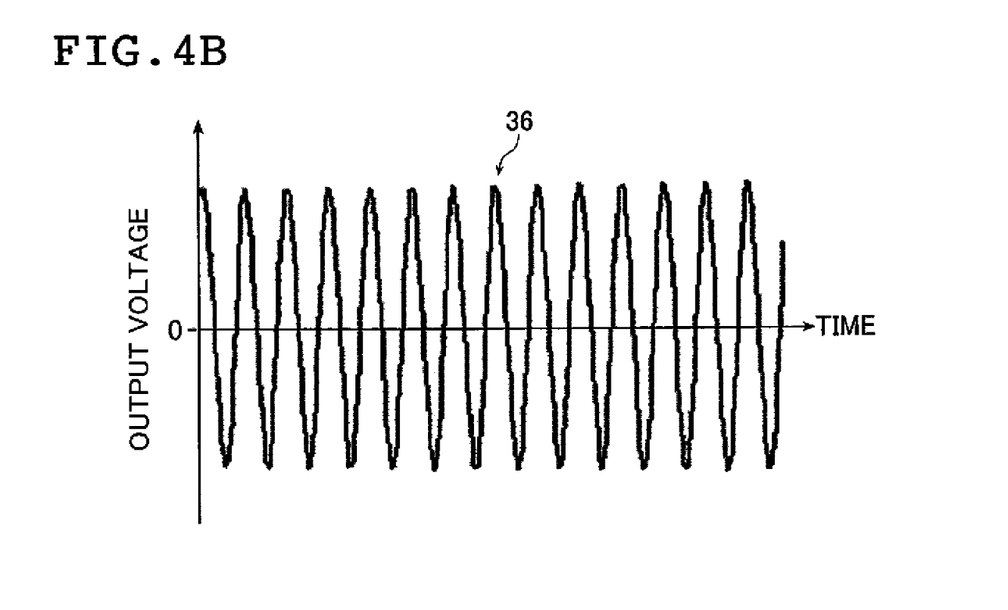
FIG. 4B is a graph illustrating a rotation detection signal obtained by the wheel speed sensor based on a rotation of a wheel.

When the wheel 12 rotates, the tooth 30a and the gap 30b alternately oppose the sensor unit 32, to thereby change a magnetic field in the sensor unit 32. Due to the change in the magnetic field, a voltage is generated in the coil. At this time, the wheel speed sensor 26 (sensor unit 32) outputs the rotation detection signal 36 of sin wave alternating current, for example, as shown in FIG. 4B, according to the rotation of the wheel 12. Since the number of the teeth 30a of the gear pulsar 30 is predetermined, the rotation detection signal 36 output by the wheel speed sensor 26 (sensor unit 32) has the same number of waves for each one rotation of the wheel, regardless of the wheel speed. In other words, the number of portions forming peaks, which corresponds to convex portions in the output signal output by the wheel speed sensor 26 (sensor unit 32), does not change regardless of the wheel speed. Therefore, in this embodiment, the time series data of acceleration and the data on a rotational position of the wheel can be associated with each other. Accordingly, when the wheel makes one round, it is possible to specify each value in the time series data of acceleration corresponding to each rotational position of the wheel.

The braking device 14 of FIG. 2 has a function of applying a brake force to the wheel 12 to put a brake thereon while adjusting the brake force. Specifically, the braking device 14 adjusts a vehicle speed (wheel speed) in applying a brake force to the wheel 12 to brake the vehicle. The braking device 14 is structured similarly to a brake unit or a braking device having a function of adjusting a brake force of the brake, which is used for a general automobile.

The brake sensor 16 detects that a driver has depressed a brake pedal to put on the brake. The brake sensor 16 is connected to the control unit 18 (controller 38 (see, FIG. 5)), and outputs a signal indicating that the brake has been put on (hereinafter, referred to as brake signal), to the control unit 18 (controller 38 (see, FIG. 5)).

In the case where no brake signal is input by the brake sensor 16, the control unit 18 sets conditions, such as a threshold value, for outputting a control signal to adjust a brake force, based on data of the acceleration in the radial direction of the tire 20 detected by the acceleration sensor 24 provided to the wheel 12 and the rotation detection signal output by the wheel speed sensor 26.

Meanwhile, in the case where a brake signal is input by the brake sensor 16, the control unit 18 outputs, to the braking device 14, a control signal for adjusting the brake force, based on the data of the acceleration and the rotation detection signal each detected by the acceleration sensor 24 provided to the wheel 12 and output by the wheel speed sensor 26, respectively.

Figure 5:
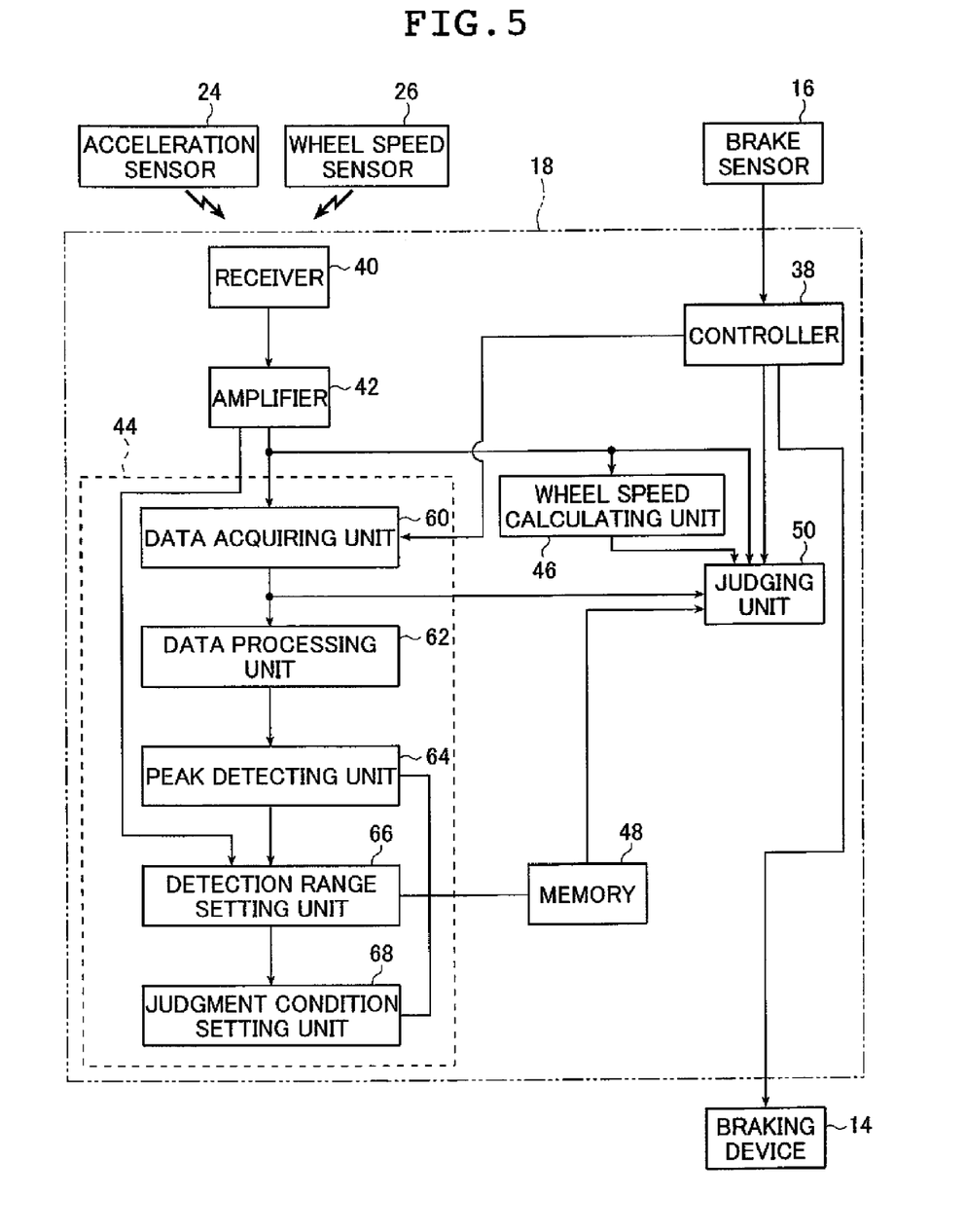
FIG. 5 is a block diagram illustrating a control unit of the brake control device according to the embodiment of the present invention.

FIG. 5 is a block diagram illustrating the control unit 18 of the brake control device 10 according to the embodiment of the present invention.

As shown in FIG. 5, the control unit 18 includes a controller 38, a receiver 40, an amplifier 42, a condition setting unit 44, a wheel speed calculating unit 46, a memory 48, and a judging unit 50.

The controller 38 is connected to the brake sensor 16. In the case where a brake signal is input from the brake sensor 16, the controller 38 outputs, to the judging unit 50, a signal indicating that the brake signal is input. Meanwhile, in the case where no brake signal is input from the brake sensor 16, the controller 38 outputs, to the condition setting unit 44 (data acquiring unit 60), a signal indicating that no brake signal is input.

Further, as described later, the controller 38 outputs, to the braking device 14, a control signal for adjusting a brake force of the braking device 14, or outputs, to the braking device 14, a control signal for not adjusting a brake force of the braking device 14, depending on whether or not an output signal (pulse signal) is obtained from the judging unit 50.

In addition, the controller 38 controls each unit constituting the control unit 18.

The receiver 40 receives the data of acceleration in the radial direction of the tire 20 detected by the acceleration sensor 24 and a rotation detection signal output by the wheel speed sensor 26.

The amplifier 42 amplifies the data of acceleration in the radial direction of the tire 20 detected by the acceleration sensor 24 and the rotation detection signal output by the wheel speed sensor 26.

The condition setting unit 44 includes the data acquiring unit 60, a data processing unit 62, a peak detecting unit 64, a detection range setting unit 66, and a judgment condition setting unit 68. The condition setting unit 44 sets judgment conditions for controlling the brake force of the braking device 14.

The condition setting unit 44 sets, as described later, a detection range and judgment conditions when a signal is input to the data acquiring unit 60, the signal indicating that no brake signal is input. The detection range and the judgment conditions are updated as occasion arises. Further, the detection range and the judgment conditions are sequentially stored in the memory 48.

The wheel speed calculating unit 46 calculates a wheel speed, based on the rotation detection signal output by the wheel speed sensor 26. In this embodiment, the number of waves corresponding to convex portions or concave portions in the rotation detection signal for one rotation of the wheel has already been identified. Accordingly, the number of waves (in the output signal) corresponding to one rotation of the wheel is counted, and the wheel speed can be calculated based on the amount of time required for the counting.

Also, the wheel speed calculating unit 46 outputs information on the wheel speed to the judging unit 50.

The memory 48 stores, as described later, various setting values (such as a detection range and judgment conditions) set by the condition setting unit 44.

Next, the condition setting unit 44 is described in detail.

Figure 6A:
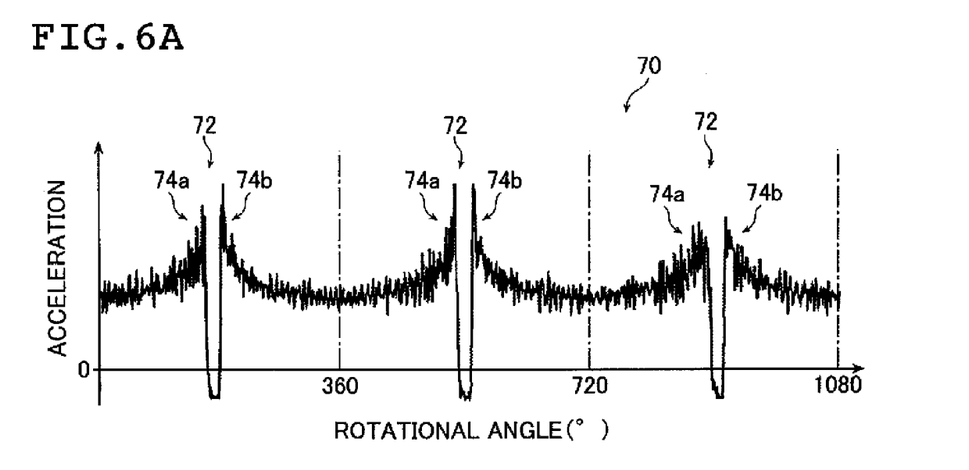
FIG. 6A is a graph illustrating acceleration data acquired by the acceleration sensor based on the rotation of the wheel according to the embodiment of the present invention.

The data acquiring unit 60 acquires time series data of acceleration (acceleration data) 70 in the radial direction R, which is, for example, shown in FIG. 6A, the data being detected by the acceleration sensor 24 and amplified by the amplifier 42.

The acceleration data 70 supplied from the amplifier 42 is in a form of analog data. The data acquiring unit 60 samples the acceleration data 70 with a predetermined sampling frequency so as to convert the acceleration data 70 into digital data. The digitized acceleration data 70 is supplied to the data processing unit 62. The data acquiring unit 60 supplies the digitized acceleration data 70 also to the judging unit 50.

Further, the data acquiring unit 60 receives an input of a signal indicating that no brake signal is input from the controller 38.

As shown in FIG. 6A, the acceleration data 70 includes a lot of noise components. It should be noted that FIG. 6A shows the acceleration data 70 for three rotations (corresponding to rotational angle of 1,080 degrees) of the wheel 12.

Figure 6B:
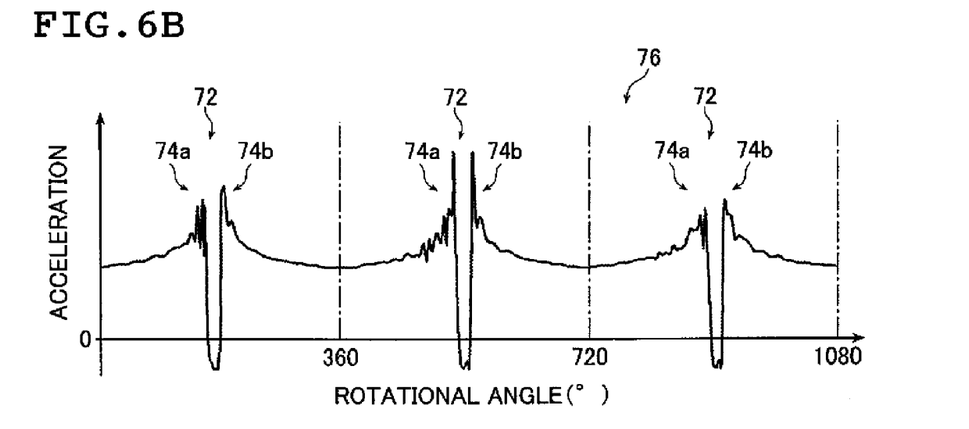
FIG. 6B is a graph illustrating smoothed acceleration data which is obtained by subjecting the acceleration data of FIG. 6A to smoothing processing.

The data processing unit 62 carries out smoothing processing using a filter, on the acceleration data 70 supplied from the data acquiring unit 60 to remove the noise components, to thereby obtain acceleration data 76 which smoothly changes, as shown in FIG. 6B.

One example of the filter to be used includes a digital filter that assumes a certain frequency as a cut-off frequency. The cut-off frequency changes depending on rotation speed or noise components. For example, if the wheel speed is 60 (km/h), the cutoff frequency is between 0.5 to 2 (kHz). Alternatively, instead of using the digital filter, moving average process, trend model process, and other suitable processes may be used as the smoothing processing.

In this case, as shown in FIGS. 6A and 6B, in one rotation of the wheel (rotational angle of 360 degrees), that is, in a section 72, there are generated regions 74a and 74b, in each of which the acceleration greatly changes due to the contact deformation of the tire. This is because acceleration components of centrifugal force due to the rotation of the tire significantly changes when the tread portion rotates to enter the contact region, and the acceleration components of centrifugal force due to the rotation of the tire significantly changes when the tread portion rotates to exit from the contact region. Accordingly, in the acceleration data 76, the region 74a in which acceleration sharply changes can be defined as contact leading edge region, and the region 74b in which acceleration sharply changes can be defined as contact trailing edge region.

Figure 7A:
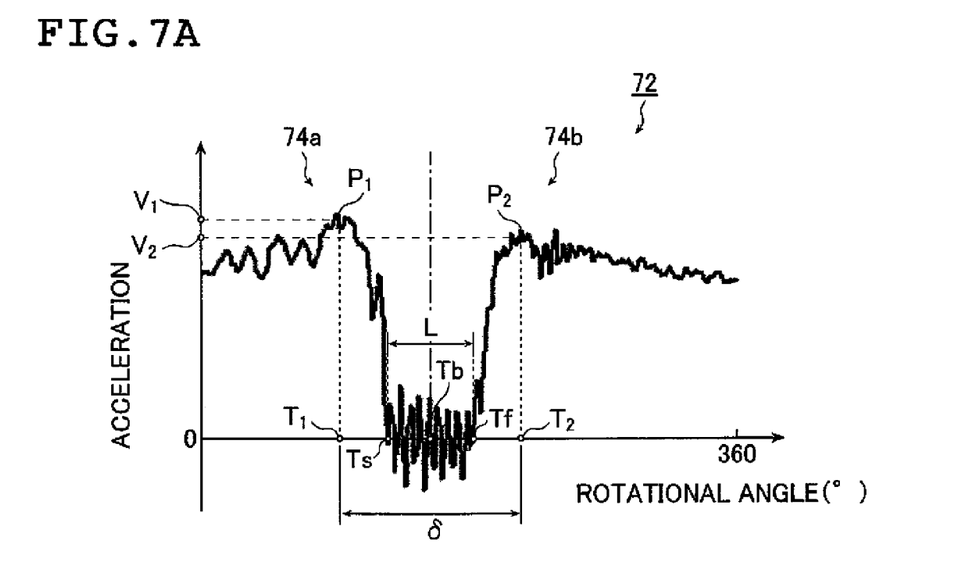
FIG. 7A is a graph illustrating a leading peak and a position thereof, a trailing peak value and a position thereof, and a detection range, in the acceleration data.

As shown in FIG. 7A, in the region 74a, a leading peak $P_1$ is generated in the vicinity of a contact leading edge of a contact region in which the tire is brought into contact with the ground due to the contact deformation of the tire, and in the region 74b, a trailing peak $P_2$ is generated in the vicinity of a contact trailing edge of the contact region in which the tire tread exits from the contact region due to the deformation generated when the tire tread gets out of the state where the tire tread is in contact with the ground.

The peak detecting unit 64 detects, in the regions where the acceleration greatly changes, the value and the position (timing) of the leading peak $P_1$ and the value and the position (timing) of the trailing peak $P_2$.

The position of the leading peak $P_1$ refers to a timing (first timing) at which the leading peak $P_1$ is generated during one rotation of the tire.

Also, the position of the trailing peak $P_2$ refers to a timing (second timing) at which the trailing out peak $P_2$ is generated during one rotation of the tire.

According to this embodiment, in one rotation of the tire (section 72), the leading peak $P_1$ corresponds to where the acceleration reaches a first maximum value, and the first maximum value is defined as the value of the leading peak $P_1$. Further, a timing at which the leading peak $P_1$ is generated is defined as a first timing $T_1$.

Also, in the section 72, after the acceleration has reached the leading peak $P_1$, the acceleration once decreases in value and then increases again to reach a second maximum value, which is defined as the trailing peak $P_2$, and the second maximum value is defined as the value of the trailing peak $P_2$. A timing at which the trailing peak $P_2$ is generated is defined as a second timing $T_2$.

As described above, the peak detecting unit 64 checks changes in value of the acceleration in one rotation of the tire, and defines peak values each corresponding to the leading peak $P_1$ and the trailing peak $P_2$, respectively, as a leading peak value $V_1$ and the trailing peak value $V_2$ to record those values. The peak detecting unit 64 also records the first timing $T_1$ of the leading peak $P_1$ and the second timing $T_2$ of the trailing peak $P_2$. The information on the leading peak value $V_1$ and the information on the trailing peak $V_2$, the first timing $T_1$ of the leading peak $P_1$, and the second timing $T_2$ of the trailing peak $P_2$ are supplied to the memory 48 and stored in the memory 48.

The detection range setting unit 66 sets a detection range L, in which acceleration data is determined for adjusting a brake force of the braking device 14. When a midway timing between the first timing $T_1$ at which the leading peak $P_1$ of the tire is generated and the second timing $T_2$ at which the trailing peak $P_2$ is generated is defined as a reference timing Tb, a section δ is defined by the first timing $T_1$ and the second timing $T_2$, with the reference timing Tb being set midway therebetween. A certain section accounting for 10 to 100% of the section δ, preferably, a certain section accounting for 30 to 80% of the section δ is set as the detection range L.

The detection range setting unit 66 of the condition setting unit 44 sets the detection range L as follows. The first timing $T_1$ of the leading peak $P_1$ is determined and the second timing $T_2$ of the trailing peak $P_2$ is also determined, to thereby calculate the reference timing Tb, which is a timing located midway between the first timing $T_1$ and the second timing $T_2$. Then, a certain section accounting for 10 to 100% of the section δ, preferably, a certain section accounting for 30 to 80% of the section δ is determined, to thereby define a section having the reference timing Tb in the center thereof. Next, a start timing Ts and the finish timing Tf of the detection range L are determined. In the manner as described above, the detection range L is set.

Further, the detection range setting unit 66 also associates the acceleration data 76 with the number of waves in a signal corresponding to in one rotation of the wheel (the rotation detection signal 36 of sin wave alternating current (see, FIG. 7B)). In this case, the rotation detection signal 36 is a sin wave alternating current, and therefore has peaks and bottoms occurring therein.

Figure 7B:
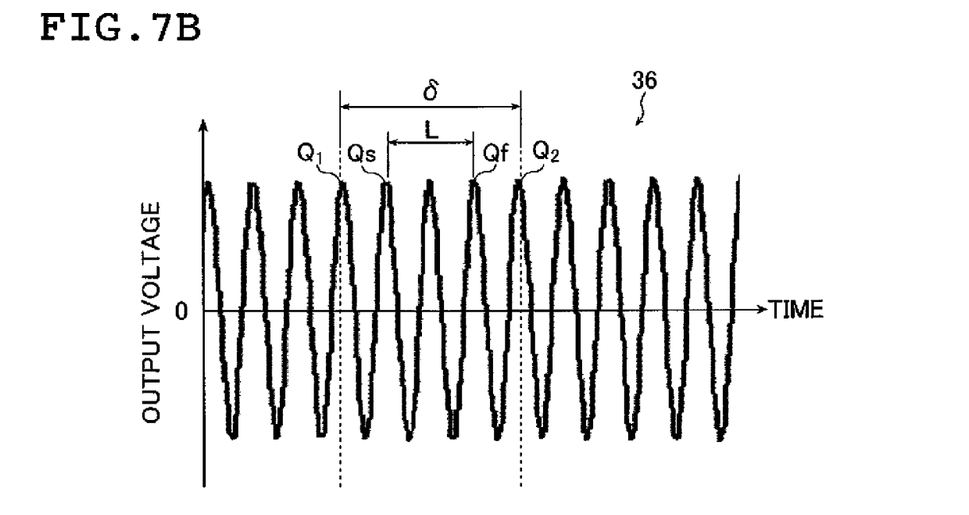
FIG. 7B is a graph illustrating a rotation detection signal acquired by the wheel speed sensor based on the rotation of a wheel.

In the above-mentioned association of data performed by the detection range setting unit 66, for example, the first timing $T_1$ of the leading peak $P_1$, the second timing $T_2$ of the trailing peak $P_2$, and the start timing Ts and the finish timing Tf of the detection range L in the acceleration data 76 are associated with the timings at which the peaks are generated in the rotation detection signal 36, the timings each coinciding in time with the first timing $T_1$, the second timing $T_2$, the start timing Ts, and the finish timing Tf. In the data of FIGS. 7A and 7B, the rotational angle and the time of the horizontal axis of the graphs correspond to each other in time, and the start timing Ts is associated with a timing Qs of one of the peaks in the rotation detection signal 36, the timing Qs being closest to the start timing Ts. The finish timing Tf is associated with a timing Qs of one of the peaks in the rotation detection signal 36, the timing Qs being closest to the finish timing Tf. In this way, when the rotation speed is constant, it is possible to specify a start timing and a finish timing which sequentially arrive along with the rotation of the tire, by counting the peaks in the rotation detection signal 36.

In place of the peaks in the rotation detection signal 36, the bottoms may be counted.

In this embodiment, for example, as shown in FIG. 7B, the first timing $T_2$ of the leading peak $P_1$ is associated with the peak $Q_2$ in the rotation detection signal 36, and the second timing $T_2$ of the trailing peak $P_2$ is associated with the peak $Q_2$ in the rotation detection signal 36. As regards the detection range L, the start timing Ts is associated with the peak Qs and the finish timing Tf is associated with the peak Qf. Accordingly, the detection range L is defined by a range between the peaks Qs and Qf. Therefore, by specifying the acceleration data between the peaks Qs and Qf in the rotation detection signal 36, it is possible to identify whether a brake force is being controlled or not.

Also, the information on the detection range L (the start timing Ts and the finish timing Tf) set by the detection range setting unit 66 is supplied to the memory 48, together with the information regarding the peaks $Q_1$, $Q_2$, Qs, and Qf in the rotation detection signal 36, and the information is stored altogether in the memory 48.

The judgment condition setting unit 68 sets as the judgement conditions a threshold value Th, which is used for determining whether it is necessary or not to adjust a brake force and the number of times the threshold value Th is to be exceeded by the value of the acceleration data. The judgment condition setting unit 68 sets, for example, 10 to 100% of the leading peak value $V_1$ or the trailing peak value $V_2$ as the threshold value Th. Then, the judgment condition setting unit 68 sets the number of times the acceleration data is to exceed the set threshold value Th.

In this embodiment, the threshold value Th is preferably set to 40 to 80% of the leading peak value $V_1$ or the trailing peak value $V_2$.

In setting the judgment condition, when the threshold value Th is set to a lower value of about 50% of the leading peak value $V_1$ or the trailing peak value $V_2$, the number of times the threshold value is to be exceeded is set to a higher value of, for example, three times.

Alternatively, when the threshold value Th is set to a higher value of about 80% of the leading peak value $V_1$ or the trailing peak value $V_2$, the number of times the threshold value is exceeded is set to a lower value of, for example, one time.

The information on the judgment conditions (the threshold value Th and the number of times the threshold value Th is to be exceeded) set by the judgment condition setting unit 68 is supplied to the memory 48, and stored in the memory 48.

Further, the judgment condition setting unit 68 may set the threshold value Th as the judgment condition, for each speed range. For example, the threshold value Th may be set for each 10 km/h. In this case, in performing brake control, the threshold value Th in the same speed range as the travelling speed (wheel speed) is referred to. For example, in performing brake control when the wheel speed is 69 km/h, the threshold value Th determined with respect to the speed range of 60 km/h which is in the same speed range (60 to 69 km/h) of the wheel speed is referred to.

Further, the judgment conditions include the threshold value Th and the number of times the threshold value is to be exceeded. However, when the number of times the threshold value Th is to be exceeded is going to be set to one, it is necessary to set only the threshold value Th as the judgment condition. In this case, the judgment condition corresponds to the threshold value Th, and it is determined whether it is necessary or not to adjust a brake force, based on the threshold value Th.

The judging unit 50 is connected to the controller 38, the wheel speed calculating unit 46, the memory 48, and the data acquiring unit 60. The rotation detection signal 36 is input to the judging unit 50. Further, the acceleration information of the tire is input to the judging unit 50 from the data acquiring unit 60. Also, the judging unit 50 determines whether the wheel 12 is rotating or not, based on the information on the wheel speed input by the wheel speed calculating unit 46.

When a signal indicating an input of a brake signal is input from the controller 38, the judging unit 50 compares the value of the acceleration data of the tire from the data acquiring unit 60 with the threshold value Th, within the detection range L. In the case where the value of the acceleration data of the tire is larger than the threshold value Th, "1" is output as the judgment signal. On the other hand, when the value of the acceleration data of the tire is smaller than the threshold value Th, "0" is output as the judgment signal. Further, the judging unit 50 creates a pulse signal based on the judgment condition in response to the judgement signal, and outputs the pulse signal to the controller 38.

A description is given of a brake control method to be performed in the case where the judging unit 50 has the judgment conditions set therein, the judgment conditions including a predetermined threshold value Th and the number of times the threshold value is to be exceeded which is set to three times.

Figure 8A:
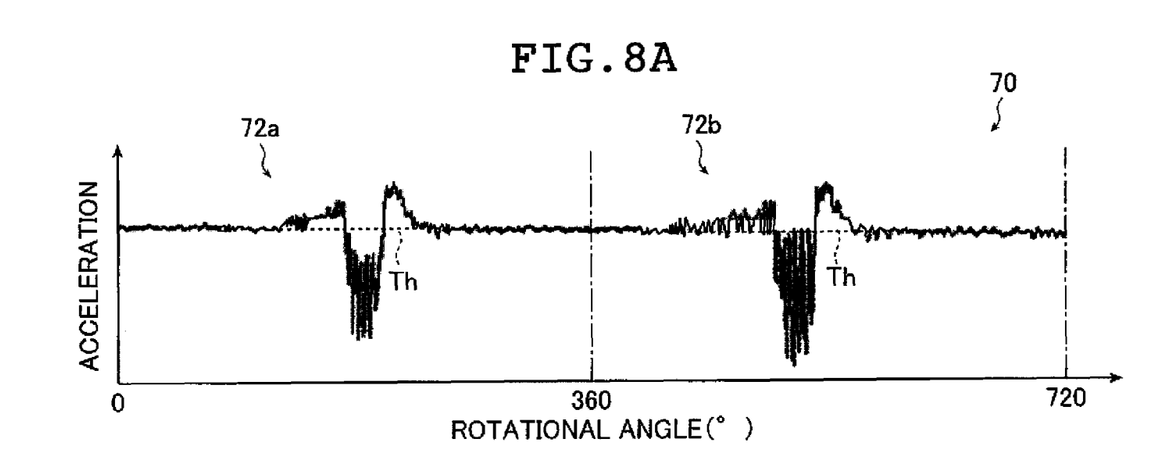
FIG. 8A is a graph illustrating acceleration data in time series for two sections.

In the case where the signal indicating an input of a brake signal is input, the judging unit 50 reads out the judgment conditions from the memory 48, and specifies, based on the acceleration data 70 for the two sections of 72a and 72b as shown in FIG. 8A, corresponding part of the acceleration data of the tire falling within the detection range L which is determined based on the rotation detection signal 36 (a section from the peak Qs to the peak Qf). Then, the judging unit 50 compares the value of the acceleration data with the threshold value Th.

Figure 8B:
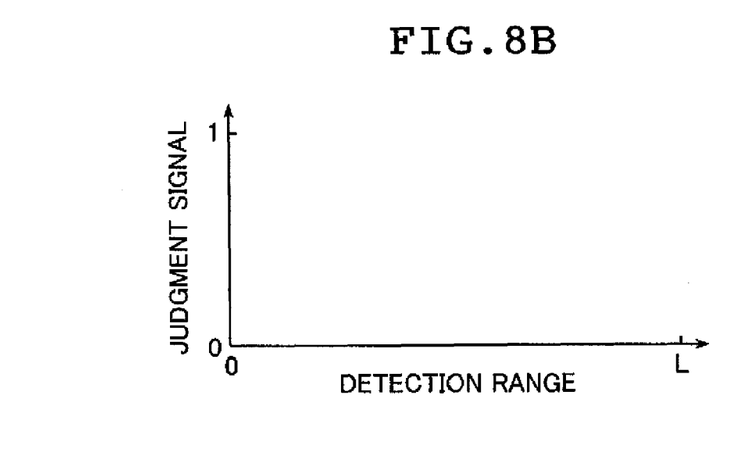
FIG. 8B is a graph illustrating a determination result obtained with respect to one of the sections.

At this time, in the section 72a, the value of the acceleration data of the tire is always smaller than the threshold value, and therefore "0" is output as the judgment signal as shown in FIG. 8B. The output of "0" as the judgment signal does not meet the judgment conditions, and therefore no pulse signal is created in the section 72a.

Figure 8C:
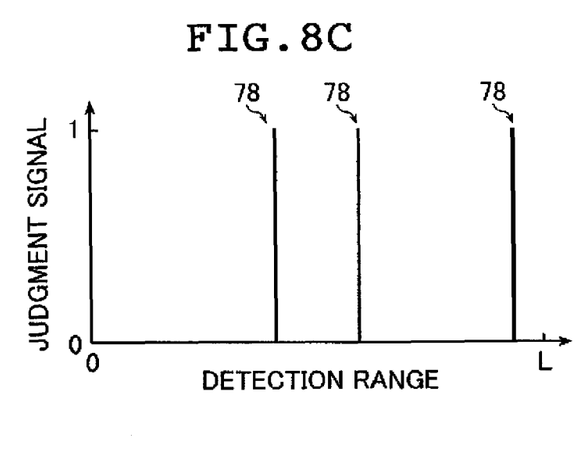
FIG. 8C is a graph illustrating a determination result obtained with respect to the other one of the sections.

On the other hand, in the section 72b, the value of the acceleration data exceeds the threshold value Th three times, and "1" is output as the judgment signal 78 three times as shown in FIG. 8C. In the case where the three times of output of "1" as the judgment signal meet the judgment conditions, a pulse signal is created in the section 72b.

Also, when the pulse signal is output from the judging unit 50, the controller 38 outputs, to the braking device 14, a control signal for adjusting a brake force.

On the other hand, when no pulse signal is output from the judging unit 50, the controller 38 does not output, to the braking device 14, a control signal for adjusting a brake force.

As described above, according to this embodiment, after the detection range L and the rotation of the wheel are associated with each other, the number of the peaks in the rotation detection signal 36 determined by the wheel speed sensor 26 is counted, and in the case where a signal indicating an input of a brake signal is input from the controller 38, only values of the corresponding part of the acceleration data of the tire falling within the detection range L may be compared with the threshold value Th. Therefore, according to this embodiment, it is possible to control a brake force of the braking device 14, without performing frequency analysis for extracting high frequency components, which makes it possible to enhance the speed of the control operation of the brake force of the braking device 14. It is also possible to control a braking of a vehicle with more accuracy. Also, according to this embodiment, it is not necessary to perform frequency analysis, whereby the structure of the device is simplified.

It should be noted each constituent unit forming the brake control device 10, to which the acceleration data of the tire amplified by the amplifier 42 is supplied, is configured by a subroutine and a subprogram executable on a computer. In other words, execution of software on a computer having a CPU and a memory allows each of the above-described constituent units to function, to thereby form the brake control device 10. Alternatively, instead of using a computer, the brake control device 10 may be configured as a dedicated device in which each function of each of the constituent units is configured by a dedicated circuit.

Next, a brake control method performed by the brake control device 10 according to this embodiment is described.

Figure 9:
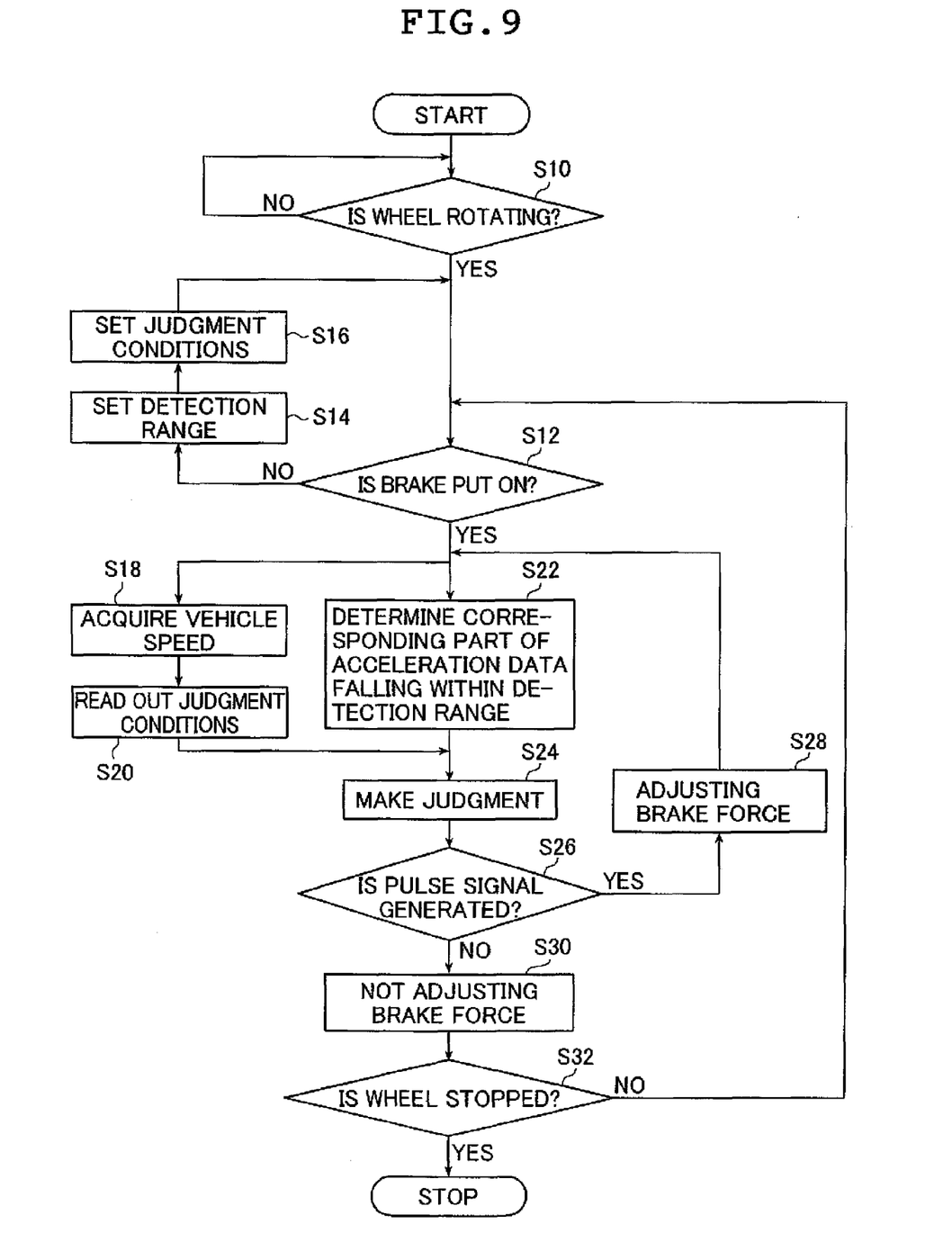
FIG. 9 is a flowchart illustrating a brake control method performed by the brake control device according to the embodiment of the present invention.
Figure 10:
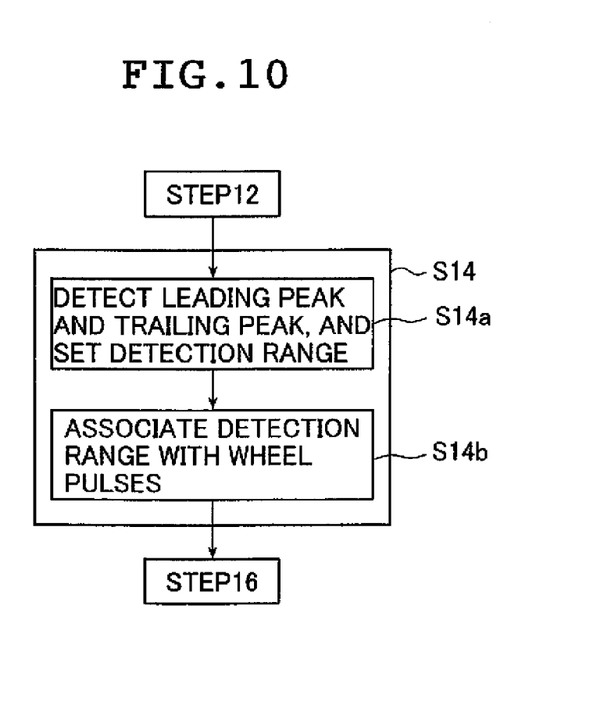
FIG. 10 is a flowchart illustrating in detail Step S14 of the flowchart shown in FIG. 9.
Figure 11:
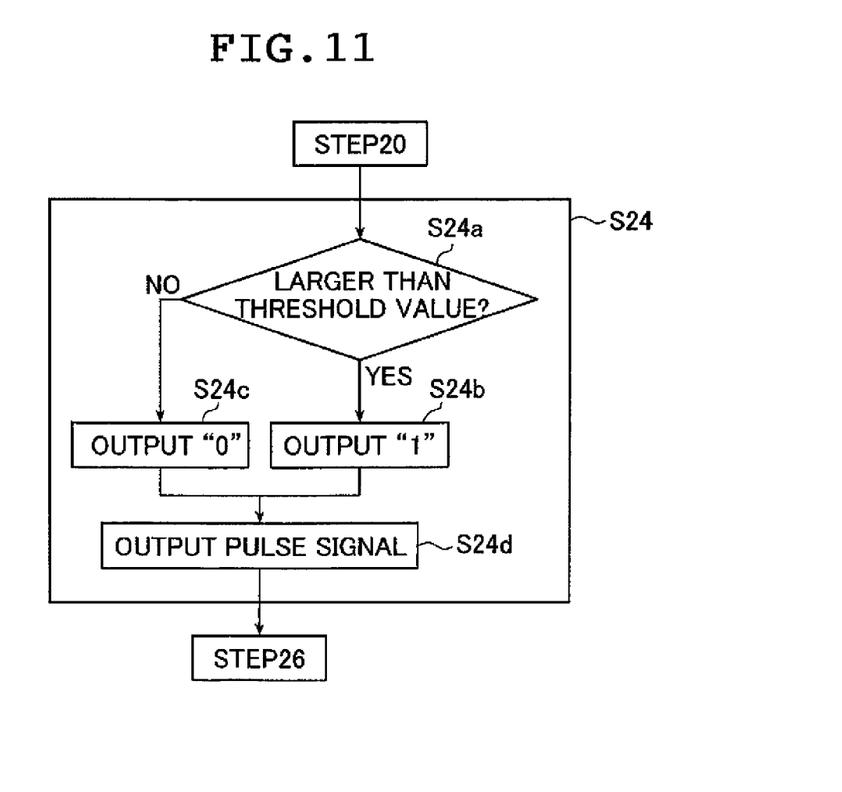
FIG. 11 is a flowchart illustrating in detail Step S24 of the flowchart shown in FIG. 9.

FIG. 9 is a flowchart illustrating the brake control method performed by the brake control device 10 of this embodiment, FIG. 10 is a flowchart illustrating in detail Step S14 of the flowchart shown in FIG. 9, and FIG. 11 is a flowchart illustrating in detail Step S24 of the flowchart shown in FIG. 9.

According to the brake control method performed by the brake control device 10 of this embodiment, first, the rotation detection signal obtained by the wheel speed sensor 26 and amplified by the amplifier 42 is supplied to the wheel speed detecting unit 46. The wheel speed detecting unit 46 calculates the wheel speed, and outputs the wheel speed to the judging unit 50. In the judging unit 50, it is detected whether the wheel is rotating or not (Step S10).

In the case where it is detected in Step S10 that the wheel is not rotating, Step S10 is repeatedly performed until the rotation of the wheel is detected.

On the other hand, in the case where it is detected in Step S10 that the wheel is rotating, the controller 38 determines whether a brake is put on or not, based on whether a brake signal is output or not from the brake sensor 16 (Step S12).

In the case where it is determined in Step S12 that a brake is not put on, the condition setting unit 44 (detection range setting unit 66) sets the detection range L as described above (Step S14). Specifically, as shown in FIG. 10, the leading peak $P_1$ (see FIG. 7A) and the first timing $T_1$ thereof (see FIG. 7A) and the trailing peak $P_2$ (see FIG. 7A) and the second timing $T_2$ thereof (see FIG. 7B) in one rotation (one section) of the tire are detected from the acceleration data of the tire. Further, the leading peak value $V_1$ and the first timing $T_1$ thereof and the trailing peak value $V_2$ and the second timing $T_2$ are determined. After that, the reference timing Tb is calculated based on the first timing $T_1$ and the second timing $T_2$ (section δ). Further, 10 to 100% (a certain ratio) of the section δ is determined as a predetermined section, and the predetermined section is set in a manner that the center of the time span of the predetermined section is located to a position corresponding to the reference timing Tb, whereby the detection range L is determined. When the detection range L is determined, the start timing Ts and the finish timing Tf of the detection range L are determined. In this manner, the detection range L (see FIG. 7A) is set (Step S14a).

Next, the detection range L is associated with the peaks Qs and Qf (see FIG. 7B) in the rotation detection signal 36 (see FIG. 7B) based on the rotation detection signal output by the wheel speed sensor 26 (Step S14b). Then, the information on the detection range L is stored in the memory 48.

Next, based on the leading peak value $V_1$ and the trailing peak value $V_2$, the threshold value Th is set, and the number of times the acceleration data is to exceed the threshold value is also set as the judgment conditions (Step S16). Then, the judgment conditions (the threshold value Th and the number of times) are stored in the memory 48.

As described above, according to this embodiment, when a brake is not put on, the condition setting unit 44 sequentially determines the detection range L and the judgment conditions (the threshold value Th and the number of times) based on the acceleration data of the tire, and updates the detection range L and the judgment conditions as occasion arises, so that the memory 48 always stores the latest detection range L. Accordingly, the detection range L and the judgment conditions corresponding to the current condition of the tire are stored in the memory 48.

According to this embodiment, the detection range L and the judgment conditions may be set without depending on a vehicle, while giving consideration to the conditions of the travelling road surface as to whether it is dry, raining, or snowing, the condition of the tire as to whether the tire is worn or not, or the performance of the tire as to whether the grip is high or low, to thereby perform brake control with stability.

On the other hand, when a brake is put on in Step S12, the vehicle speed (wheel speed) is acquired from the wheel speed detecting unit 46 (Step S18).

Next, the set judgment conditions (the threshold value Th and the number of times) are read out from the memory 48. The judgment conditions may be set according to the wheel speed.

Further, corresponding part of the acceleration data falling within the detection range L is extracted from the acceleration data acquired by the data acquiring unit 60 (Step S22). Specifically, the peak values in the rotation detection signal are counted, and the acceleration data between the peaks Qs and Qf is determined.

Next, as shown in FIG. 11, the value of the acceleration data between the peaks Qs and Qf is compared with the threshold value Th to determine whether or not the threshold value Th is larger than the value of the acceleration data (Step S24a).

In the case where it is determined in Step S24a that the value of the acceleration data is larger than the threshold value Th, "1" is output as the judgment signal (Step S24b).

On the other hand, in the case where the value of the acceleration data is smaller than the threshold value Th, "0" is output as the judgment signal (Step S24c).

Next, as shown in FIG. 11, with respect to the judgment signal of "1" or "0", the signal is converted according to the judgment result based on the judgment conditions. When the judgment conditions are the satisfied, a pulse signal is created (Step S24d).

In this manner, as shown in FIG. 9, the pulse signal is output to the controller 38 (Step S26).

In the case where the judgment condition only includes the threshold value Th, the pulse signal is created when the judgment signal of "1" is output, and the pulse signal is not created when the judgment signal of "0" is output.

In the case where the pulse signal is created in Step S26, the controller 38 outputs a control signal for adjusting a brake force of the braking device 14. Then, the process returns to Step S18 and Step S22, in which the value of the acceleration data and the threshold value Th are compared with each other, and it is determined whether the threshold value is larger than the value of the acceleration data or not (Step S24a).

On the other hand, in the case where the pulse signal is not created in Step S26, it is not necessary to adjust a brake force of the braking device 14, and therefore a control signal for adjusting the brake force is not output from the controller 3B (Step S30).

Next, the judging unit 50 determines, based on the wheel speed detected by the wheel speed detecting unit 46, whether the wheel is stopped or not (Step S32).

In the case where it is determined in Step S32 that the wheel is stopped, the brake control operation is suspended.

On the other hand, in the case where it is determined in Step S32 that the wheel is not stopped, the process returns to Step S12, in which it is determined again whether a brake is put on or not. Then, the above-mentioned steps (Step S18 to Step S32) are repeatedly performed.

As described above, the brake control method is performed by the brake control device 10 of this embodiment, to thereby control the braking of the vehicle.

According to this embodiment, in controlling the brake force of the braking device 14 with respect to the wheel 12, it is possible to control the brake force without performing frequency analysis by, for example, extracting high frequency components, thereby enabling speeding up of the control operation of the control force. Accordingly, it is possible to control braking of the vehicle more promptly. Also, according to this embodiment, it is not necessary to perform frequency analysis, whereby the structure of the device is simplified.

Also, according to this embodiment, the acceleration sensor 24 is provided to an inner circumference surface of the tread portion (a surface of an inner liner portion) of a tire. Alternatively, the acceleration sensor 24 may be embedded in the tread portion. Also, the acceleration sensor 24 may be provided, not only to the central region of the tire tread portion, but also to a shoulder region of the tread portion of a tire, in the tire width direction, which is not specifically limited.

Further, one acceleration sensor 24 may be provided to one tire, or a plurality of acceleration sensors 24 may be provided to one tire. In this case, it is preferable to provide two or more acceleration sensors 24 at regular intervals on the tire circumference. In particular, it is preferable to provide four acceleration sensors 24 at regular intervals. When the plurality of acceleration sensors 24 are provided as described above, a plurality of detection ranges can be determined in one rotation of the tire, which provides more opportunities to control braking, thereby making it possible to adjust the brake force with higher accuracy. Accordingly, it is possible to control braking of a vehicle more promptly.

In the above, the brake control method and the brake control device according to the present invention have been described in detail. It should be understood that the present invention is not limited to the above-mentioned embodiment, and rather covers all modifications and alternatives, without departing from the spirit of the present invention.

What is claimed is:

1. A brake control method for a braking device having a function of applying a brake force to a wheel equipped with a tire to put a brake on a vehicle while adjusting the brake force, the brake control method comprising the steps of:
    acquiring, in time series, acceleration data of acceleration applied to the tire in a radial direction of the tire;
    setting a predetermined detection range with respect to the acceleration data and setting a threshold value with respect to values of corresponding part of the acceleration data falling within the predetermined detection range;
    specifying the corresponding part of the acceleration data falling within the predetermined detection range; and
    controlling, when a value or values of the specified part of the acceleration data exceeds or exceed the threshold value, the brake force to be applied to the wheel as a control target,
    wherein, in the step of setting the predetermined detection range, when a timing at which a leading peak in the acceleration data occurs in a vicinity of a leading edge of a contact region of the tire on a ground is determined to be set as a first timing, a timing at which a trailing peak in the acceleration data occurs in a vicinity of a trailing edge of the contact region of the tire is determined to be set as a second timing, and a midway timing between the first timing and the second timing is set as a reference timing, a certain section accounting for 10 to 100% of a section defined between the first timing and the second timing with the reference timing being located in a center of the section is defined, and the defined certain section is set as the predetermined detection range.

2. The brake control method according to claim 1, wherein: in the step of specifying the corresponding part of the acceleration data falling within the predetermined detection range, a start timing and a finish timing of the predetermined detection range are associated with peak positions in an output signal which has a predetermined number of peaks which are generated in one rotation of the wheel, to thereby specify the corresponding part of the acceleration data.

3. The brake control method according to claim 1, wherein the threshold value corresponds to a certain value falling within a range which accounts for 10 to 100% of a value of the leading peak or a value of the trailing peak in the acceleration data, in a state where the wheel is not applied with a brake force.

4. A brake control device, comprising:
    a braking device provided to a wheel equipped with a tire, the braking device having a function of applying a brake force to the wheel to put a brake thereon while adjusting the brake force;
    an acceleration sensor for outputting time series acceleration data of acceleration acting on the tire in a radial direction of the tire;
    a control unit provided with a detection range setting unit to which the acceleration data is supplied, the detection range setting unit setting a predetermined detection range with respect to the supplied acceleration data and setting a threshold value with respect to values of a corresponding part of the acceleration data falling within the predetermined detection range, the control unit specifying the corresponding part of the acceleration data falling within the predetermined detection range, comparing a value or values of the specified part of the acceleration data with the threshold value, and outputting, in a case where the value or the values of the specified part of the acceleration data exceeds or exceed the threshold value, a control signal for causing the braking device to adjust the brake force,
    wherein, in the acceleration data, when a timing at which a leading peak occurs in a vicinity of a leading edge of a contact region of the tire on a ground is generated is set as a first timing, a timing at which a trailing peak occurs in a vicinity of a trailing edge of the contact region of the tire is set as a second timing, and a midway timing between the first timing and the second timing is set as a reference timing, the detection range setting unit defines a certain section accounting for 10 to 100% of a section defined between the first timing and the second timing with the reference timing being located in a center of the section and sets the section as the predetermined detection range.

5. The brake control device according to claim 4, wherein: the control unit specifies the corresponding part of the acceleration data falling within the predetermined detection range, by obtaining an output signal which has a predetermined number of peaks generated in one rotation of the wheel, and by associating a start timing and a finish timing of the predetermined detection range with peak positions in the output signal.

6. The brake control device according to claim 4, wherein the threshold value corresponds to a certain value falling within a range which accounts for 10 to 100% of a value of the leading peak or a value of the trailing peak in the acceleration data, in a state where the wheel is not applied with a brake force.

* * * * *